(12) United States Patent
Wang et al.

(10) Patent No.: US 7,876,958 B2
(45) Date of Patent: Jan. 25, 2011

(54) SYSTEM AND METHOD FOR DECOMPOSING A DIGITAL IMAGE

(75) Inventors: Yizhou Wang, Sunnyvale, CA (US); Dashan Gao, La Jolla, CA (US); Haitham Hindi, Menlo Park, CA (US); Minh Binh Do, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 883 days.

(21) Appl. No.: 11/821,980

(22) Filed: Jun. 25, 2007

(65) Prior Publication Data

US 2008/0317337 A1    Dec. 25, 2008

(51) Int. Cl.
*G06K 9/34* (2006.01)
(52) U.S. Cl. .................................................... 382/173
(58) Field of Classification Search ....................... None
See application file for complete search history.

(56) References Cited

U.S. PATENT DOCUMENTS 5,937,084 A * 8/1999 Crabtree et al. ............. 382/137
7,657,089 B2 * 2/2010 Li et al. ...................... 382/170
7,760,372 B2 * 7/2010 McCarthy et al. .......... 358/1.13

OTHER PUBLICATIONS

K. Kise et al., "Segmentation of Page Images Using the Area Voronoi Diagram," Comp. Vision and Image Understanding, vol. 70, No. 3, pp. 370-382 (Jun. 1998).

C.C. Chang and C.J. Lin, "LIBSVM: A Library for Support Vector Machines," http://www.csie.ntu.edu.tw/~cjlin/libsvm (2001).

J.N. Darroch and D. Ratcliff, "Generalized Iterative Scaling for Log-Linear Models," Ann. Of Math. Stats., vol. 43 (1972).

C. Guo et al., "Modeling Visual Patterns by Integrating Descriptive and Generative Methods," Int'l J. of Comp. Vision, vol. 53, No. 1, pp. 5-29 (Jun. 2003).

Jiseng Liang, Ihsin T. Phillips, Robert M. Haralick, "An Optimization Methodology for Document Structure Extraction on Latin Character Documents," IEEE Transactions on Pattern Analysis and Machine Intelligence, vol. 23 No. 7, pp. 719-734 (Jul. 2001).

A.K. Jain, B. Yu, "Document Representation and its Application to Page Decomposition," IEEE Transactions on Pattern Analysis and Machine Intelligence, vol. 20, No. 3 (Mar. 1998).

Z. Shi, V. Govindaraju, "Dynamic Local Connectivity and its Application to Page Segmentation," Proceedings of the 1st ACM Workshop on Hardcopy Document Processing, pp. 47-52, Nov. 12, 2004, Washington, DC, USA.

(Continued)

*Primary Examiner*—Yuzhen Ge
(74) *Attorney, Agent, or Firm*—Patrick J.S. Inouye

(57) ABSTRACT

A system and method for decomposing a digital image is provided. A digital image is represented as a word-graph, which includes words and visualized features, and zone hypotheses that group one or more of the words. Causal dependencies of the zone hypotheses are expressed through a learned generative zone model to which costs and constraints are assigned. An optimal set of the zone hypotheses are inferred, which are non-overlapping, through a heuristic search of the costs and constraints.

26 Claims, 8 Drawing Sheets

OTHER PUBLICATIONS

G. Nagy, S. Seth, and M. Viswanathan, "A Prototype Document Image Analysis System for Technical Journals," Computer (25), No. 7, Jul. 1992, pp. 10-22.

K.Y. Wong, R.G. Casey, F.M. Wahl, "Document Analysis System," IBM Journal of Research and Development 26 (1982), pp. 647-656.

Henry S. Baird, "Background Structure in Document Images, Document Image Analysis," World Scientific, pp. 17-34, (1994).

T.M. Breuel, "Two Geometric Algorithms for Layout Analysis, Document Analysis Systems," Princeton, NJ, (2002).

L. O'Gorman, "The Document Spectrum For Page Layout Analysis," IEEE Transactions on Pattern Analysis and Machine Intelligence, vol. 15, (1993).

M. Shilman, P. Liang and P. Viola, "Learning Nongenerative Grammatical Models for Document Analysis," Tenth IEEE International Conference Computer Vision (ICCV), (2005).

P.A. Viola and M.J. Jones, "Rapid Object Detection Using a Boosted Cascade of Simple Features," Proc. of Comp. Vision and Pattern Recog., pp. 511-518 (2001).

W. Lipski et al., "On Two Dimensional Data Organization II," Fundamenta Informaticae, V. 2, pp. 245-260 (1977).

* cited by examiner

JOURNAL OF MAKE BELIEVE VOL. 2 ISSUE 4

NARCISSISM: A CASE STUDY

ABSTRACT: *THIS DOCUMENT EXAMINES THE ISSUES OF RELATIONSHIP AS PERTAINING TO KATERINA AND SERGEI.*

MICKAEL MICKAELVICH

WRAPPED UP IN GETTING WHAT SHE DESIRES, KATERINA FOCUSES SOLELY ON SERGEI. WHEN ANYONE GETS BETWEEN HER AND SERGEI, KATERINA IS QUICK TO REMOVE THAT PERSON. WHEN HER FATHER-IN-LAW CATCHES SERGEI, KATERINA POISONS HIM. KATERINA KILLS HER HUSBAND WHEN HE FINDS OUT ABOUT HER AND SERGEI. THEN FINALLY, WHEN SONYA COMES BETWEEN KATERINA AND SERGEI, KATERINA THROWS HERSELF AND SONYA FROM THE SHIP, TO KEEP SONYA FROM SERGEI.

THROUGHOUT, KATERINA ACTS OBLIVIOUS OF EVERYTHING, EXCEPT SERGEI. SINCE BOTH KATERINA AND SERGEI ACT IMPULSIVELY AND IN DISREGARD TOWARD OTHER PEOPLE, THERE IS A LACK OF MORAL CONFLICT. KATERINA HAS EYES ONLY FOR SERGEI. SHE WILL DO ANYTHING AND GIVE UP ANYTHING JUST SO THAT SHE CAN BE NEAR HIM.

JOURNAL OF MAKE BELIEVE VOL. 2 ISSUE #4

NARCISSISM: A CASE STUDY

ABSTRACT: *THIS DOCUMENT EXAMINES THE ISSUES OF RELATIONSHIP AS PERTAINING TO KATERINA AND SERGEI, AND HOW EACH TRIES TO GAIN THE UPPER HAND.*

MICKAEL MICKAELVICH

WRAPPED UP IN GETTING WHAT SHE DESIRES, KATERINA FOCUSES SOLELY ON SERGEI. WHEN ANYONE GETS BETWEEN HER AND SERGEI, KATERINA IS QUICK TO REMOVE THAT PERSON. WHEN HER FATHER-IN-LAW CATCHES SERGEI, KATERINA POISONS HIM. KATERINA KILLS HER HUSBAND WHEN HE FINDS OUT ABOUT HER AND SERGEI. THEN FINALLY, WHEN SONYA COMES BETWEEN KATERINA AND SERGEI, KATERINA THROWS HERSELF AND SONYA FROM THE SHIP, TO KEEP SONYA FROM SERGEI.

THROUGHOUT, KATERINA ACTS OBLIVIOUS OF EVERYTHING, EXCEPT SERGEI. SINCE BOTH KATERINA AND SERGEI ACT IMPULSIVELY AND IN DISREGARD TOWARD OTHER PEOPLE, THERE IS A LACK OF MORAL CONFLICT. KATERINA HAS EYES ONLY FOR SERGEI. SHE WILL DO ANYTHING AND GIVE UP ANYTHING JUST SO THAT SHE CAN BE NEAR HIM.

SYSTEM AND METHOD FOR DECOMPOSING A DIGITAL IMAGE

FIELD

This application relates in general to digital image processing and, in particular, to a system and method for decomposing a digital image.

BACKGROUND

Document processing devices, such as copiers, scanners, and digital facsimile machines, are increasingly able to handle digitally equivalent versions of paper documents, which can contain digitized text and pictorial, graphical, and other data. However, further processing is often needed to convert raw digital images into an electronically usable form, such as needed for pattern recognition, document classification and retrieval, and other tasks. For example, digital images must often be broken down or "decomposed" into constituent parts or "zones."

Post-digitization image decomposition can be problematic particularly when a large volume of documents are being converted, thereby rendering manual document decomposition impracticable. Conventional page decomposition generally involves bottom-up, top-down, or hybrid methodologies. Bottom-up approaches, such as the Block Adjoining Graph method, detect individual connected components, which are progressively aggregated into higher level structures, such as words, lines, paragraphs, and so forth. Top-down approaches, such as the X-Y Tree method, recursively split a digital image into rectangular areas by alternating horizontal and vertical cuts along white space. These methodologies are typically implemented through ad hoc rules that can be brittle and which often produce varying results, even with little actual change in the data.

Therefore, there is a need for a non-rule based approach to decomposing digital images into constituent parts or zones without a reliance on specific visual aspects, such as connected components, graphical features, and white space.

SUMMARY

A system and method for digital document image processing through heuristic search is provided to decompose digital images into constituent parts or "zones." Overlapping zone hypotheses are first generated based on generic visual features. Each zone hypothesis, or candidate zone, is evaluated quantitatively by a learned generative zone model, which includes a likelihood model for zones and a prior model for zone relations. An optimal set of non-overlapping zones that covers a given document image are inferred by heuristic searches that can include a binary integer linear programming problem and an A* best-first graph search. Other heuristic searches are possible.

One embodiment provides a system and method for decomposing a digital image. A digital image is represented as a word-graph, which includes words and visualized features, and zone hypotheses that group one or more of the words. Causal dependencies of the zone hypotheses are expressed through a learned generative zone model to which costs and constraints are assigned. An optimal set of the zone hypotheses are inferred, which are non-overlapping, through a heuristic search of the costs and constraints.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a diagram showing, by way of example, a word-graph.

FIG. 5 is a diagram showing, by way of example, a zone map.

DETAILED DESCRIPTION

System

Figure 1:
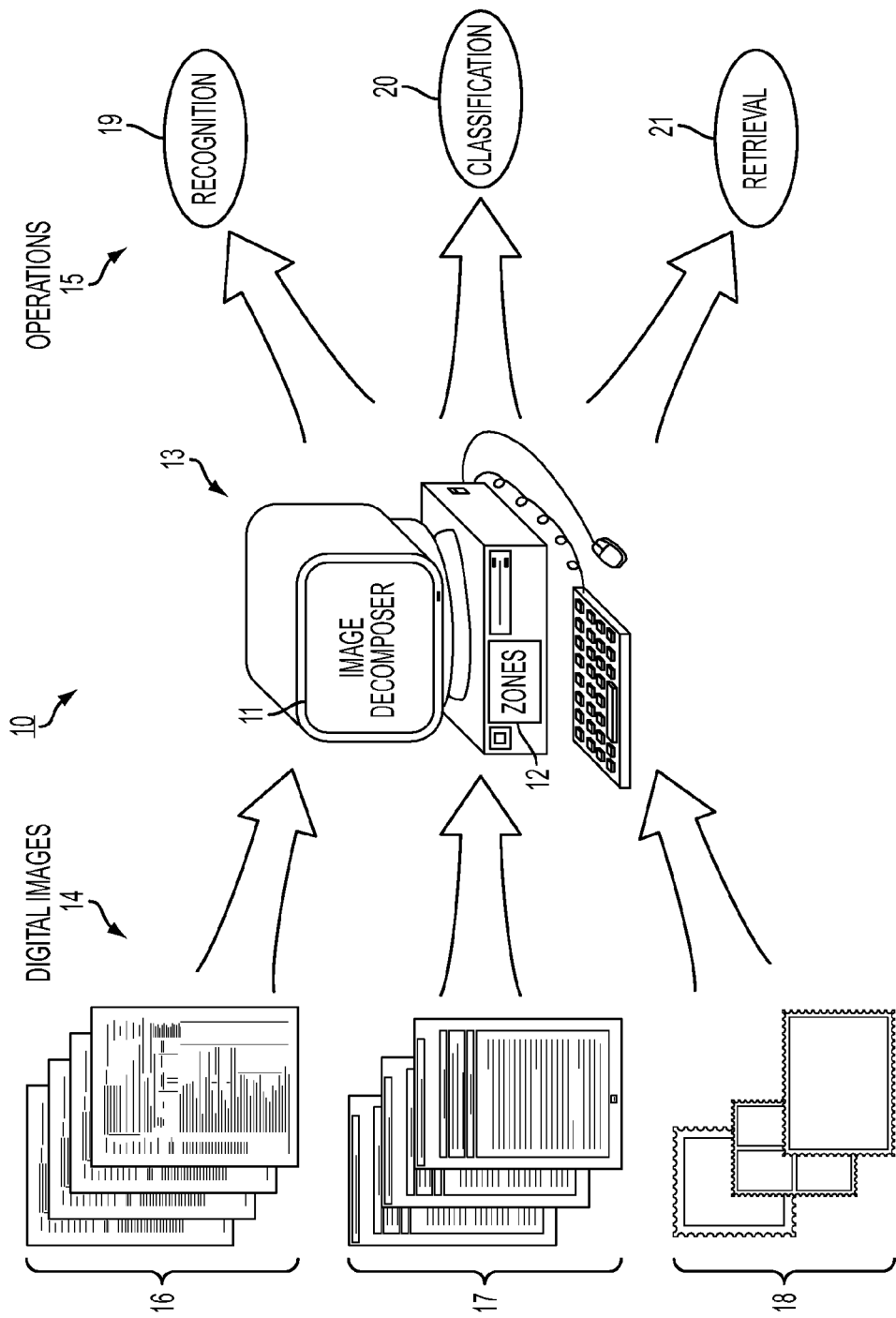
FIG. 1 is a block diagram showing a system for decomposing a digital image, in accordance with one embodiment.

Digital image decomposition, which is frequently performed within the larger context of image processing, includes identifying the constituent parts or zones of each document page to aid in subsequent processing. FIG. 1 is a block diagram showing a system 10 for decomposing a digital image 14, in accordance with one embodiment. As used herein, the terms "digital image," "document image," "digitized document," and "digitized facsimile" are used interchangeably and refer to a digital image representation of a printed document, which can include digitized text and pictorial, graphical, and other data, either alone or in combination.

In one form of image analysis, digital image decomposition is performed by an image decomposer 11, which operates on a computer system 13, or other image processing device capable of receiving and operating on an electronically-stored digital image, such as copiers, scanners, and digital facsimile machines. Other devices are possible. Additionally, the digital image decomposition can also be performed as a stand alone function apart from image analysis or other tasks.

The image decomposer 11 accepts digital images 14 as inputs and identifies constituent parts or zones 12 within each individual document page, as further described below beginning with reference to FIG. 2 et seq. Digital images 14 can include, for instance, form and preprinted documents 16, such as income tax return forms; textual documents 17, such as publications, news and magazine articles, and the like; and hybrid data 18, such as digital representations of postage stamps, which include pictorial, graphical, and textual data. Other types of digital images 14 are possible.

The image decomposer 11 analyses each digital image 14 and identifies individual zones 12 within each page. Following decomposition, post-analysis operations 15 can be performed, which can include, by way of example, pattern recognition 19, document classification 20, and document retrieval 21. Other operations 15 are possible.

The computer system 13 includes components conventionally found in computing devices, such as a central processing unit, memory, network interface, persistent storage, and network interconnectivity. The image decomposer 11 can also be directly implemented in hardware as a microprogrammed device or dedicated computation module. Other systems and components are possible.

Method

Digital image decomposition identifies zones within each document page. A "zone" is a perceptually compact and consistent block of text, such as a paragraph, or graphical image patch. FIG. 2 is a process flow diagram showing a method 30 for decomposing a digital image 14, in accordance with one embodiment. The method is performed as a series of process steps by general purpose programmable computing device, such as a personal computer, or other image processing device.

Digital image decomposition is performed in representational, modeling, and inferential stages. Initially, each digital image is received as an input in the form of electronically-stored data (step 31), from which logical digital image representations are built (step 32). Each digital image 14 is internally represented as a two-layer hierarchical model based on generic visual features. The hierarchical model includes a "primitive" layer that forms a word-graph (step 33), as further described below with reference to FIGS. 3 and 4, and a "layout" layer that provides overlapping candidate zones or zone "hypotheses" (step 34), as further described below with reference to FIGS. 5 and 6. Causal dependencies occurring between the primitive and layout layers are expressed through zone models (step 35) that are independently scored based on learning. The zone models include a likelihood model for zones (step 36) and a prior model for zone relations (step 37). Zones with poor scores are discarded and zones 12 within the digital image 14 are inferred from the remaining healthy zone hypotheses (step 38), as further described below with reference to FIG. 8. Finally, the identified zones 12 are provided as outputs (step 39). Other processing stages and operations are possible.

Image Representation

Each digital image 14 is represented by a two-layer hierarchical model, which includes a primitive layer and a layout layer.

Word-Graph Generation—the "Primitive" Layer

The primitive layer represents individual "words" as atomic primitives that transform pixels into compact atomic representations. Thus, the "words" need not be lexically-correct words; word fragments are acceptable. The words are connected into a word-graph. FIG. 3 is a diagram showing, by way of example, a word-graph. Other forms of word-graphs are possible.

In terms of notation, the word-graph $G_w$ is denoted:

$$G_w = \langle V, E \rangle \quad (1)$$

where $N_w$ is the number of words in the digital image 14; $V = \{v_i; i=1, \ldots, N_w\}$ is a set of vertices v in the word-graph $G_w$, that correspond to each word w; and $E = \{e=(i, j)w_{ij}): v_i, v_j \in V, w_{ij} \in R\}$ is a set of edges e that associates a weight $w_{ij}$ that represents the bounding force between a pair of words $w_i$ and $w_j$.

Figure 2:
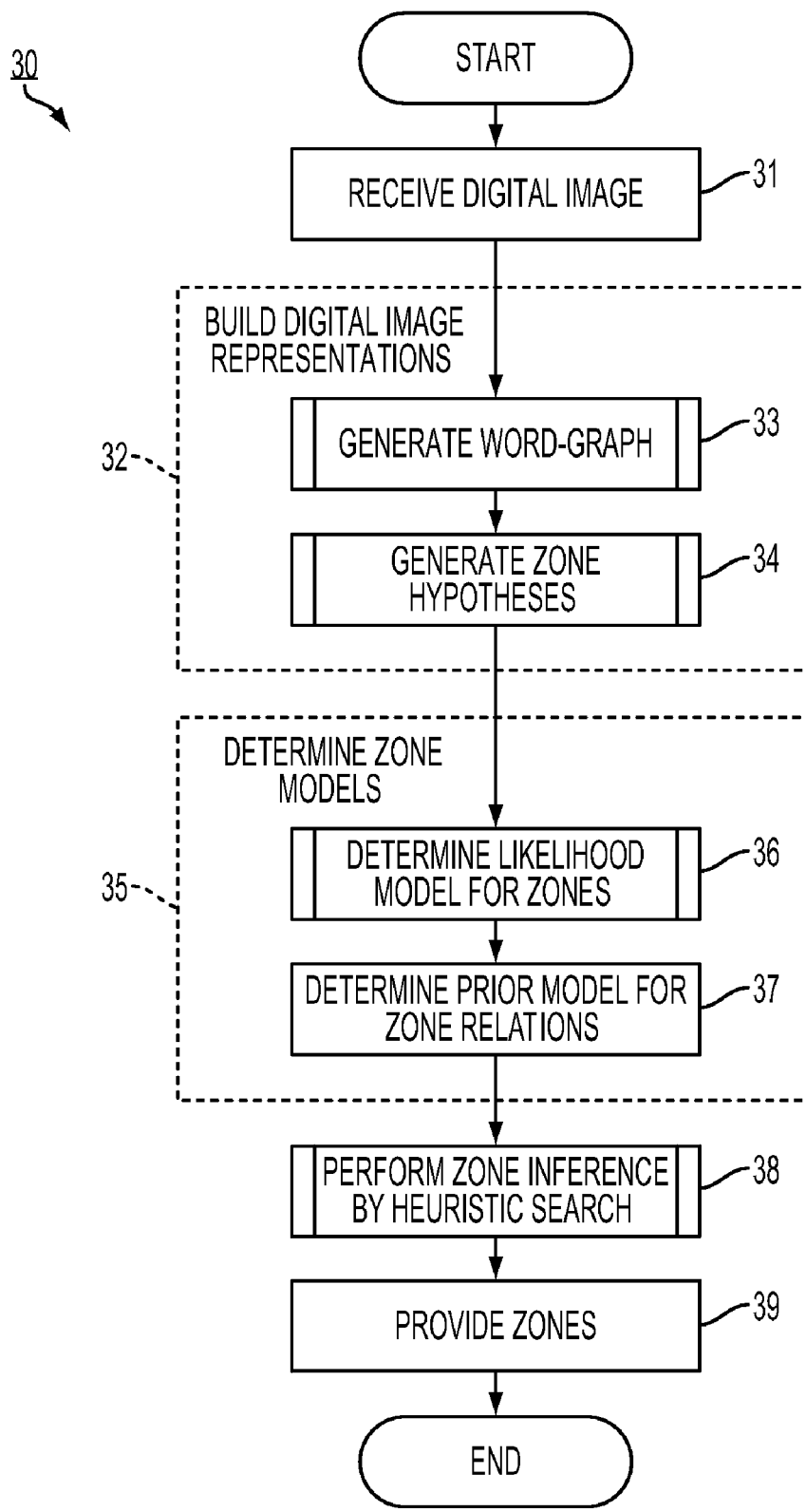
FIG. 2 is a process flow diagram showing a method for decomposing a digital image, in accordance with one embodiment.
Figure 4:
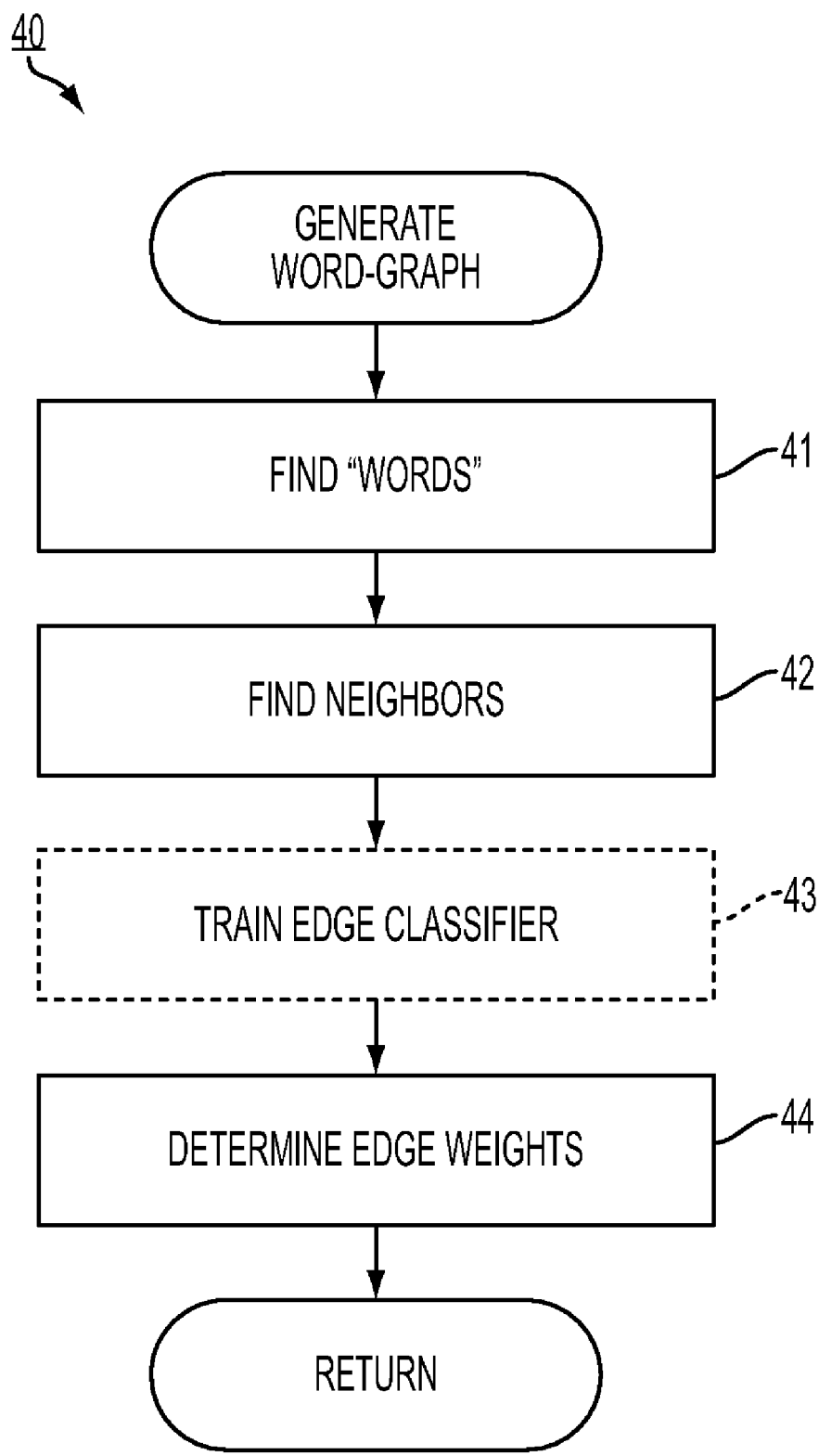
FIG. 4 is a process flow diagram showing a routine for generating a word-graph for use in the method of FIG. 2.

FIG. 4 is a process flow diagram showing a routine for generating a word-graph for use in the method 30 of FIG. 2. First, individual "words" within the digital image 14 are found (step 41). The words can be detected through feature extraction through Harr-like filters, also known as Viola-Jones rectangular filters, such as described in P. A. Viola and M. J. Jones, "Rapid Object Detection Using a Boosted Cascade of Simple Features," *Proc. of Comp. Vision and Pattern Recog*, pp. 511-518(2001), the disclosure of which is incorporated by reference. The Harr-like filters include horizontal step edge, vertical step edge, horizontal bar, vertical bar, and diagonal block filters, which can be varied in size and scale. Other forms of word detection are possible.

Next, neighboring words are found (step 42). Neighboring words can be identified using a Voronoi tessellation neighbor finding algorithm, such as described in K. Kise et al., "Segmentation of Page Images Using the Area Voronoi Diagram," *Comp. Vision and Image Understanding*, V. 7, No. 3, pp. 370-382 (June 1998), the disclosure of which is incorporated by reference. Other forms of neighbor finding are possible.

The edge weights, including features associated with each word, are then determined (step 44), which are evaluated as posterior probabilities by a learned binary edge classifier (step 43). The features are generic and visual, and include:

(1) "Word" compactness in a zone, which is denoted:

$$f_w^{(0)}(g) = \frac{\sum_{i=1}^{k} A(g_i)}{A(z)} \quad (2)$$

such that $0 < f_w^{(0)}(g) \leq 1$, where $g_i$ is the $i^{th}$ connected component of the word-graph within a zone hypothesis. Generally, k=1 within a zone, which indicates that words are highly connected to one another. $A(\cdot)$ is the area of a connected component bounding box.

(2) "Word" height(size) consistency in a zone, which is denoted:

$$f_w^{(1)}(g) = \frac{n_w^d(g)}{n_w(g)} \quad (3)$$

such that $0 < f_w^{(0)}(g) \leq 1$, where $n_w(g)$ is the number of words in a zone; and $n_w^d(g)$ is the number of words with dominant height in the zone. This feature provides the ratio of dominant sized words in a zone, which indicates the zone's font size consistency.

(3) Zone bounding box top border edge-cutting span, which is denoted:

$$f_w^{(2)}(g) = \frac{l_e^{(t)}}{l_z} \quad (4)$$

such that $0 \leq f_w^{(2)}(g) \leq 1$, where $l_z$ is the width of a zone, and $l_e^{(t)}$ is the length of the part of a zone bounding box top border that cuts the word-graph's edges.

(4) Zone bounding box bottom border edge-cutting span, which is denoted:

$$f_w^{(3)}(g) = \frac{l_e^{(b)}}{l_z} \quad (5)$$

such that $0 \leq f_w^{(3)}(g) \leq 1$, where $l_z$ is the width of a zone, and $l_e^{(t)}$ is the length of the part of a zone bounding box bottom border that cuts the word-graph's edges.

(5) Zone bounding box vertical border average edge-cutting weight, which is denoted:

$$f_w^{(4)}(g) = \frac{\sum_{i=1}^{n_e^{(v)}} w_e^{(i)}}{n_{tl}} \quad (6)$$

where $n_e^{(v)}$ is the number of edges cut by the two vertical borders of a zone bounding box; $w_e^{(i)}$ is the $i^{th}$ edge weight; and $n_{tl}$ is the number of text lines in the zone. This feature indicates the connection force of a proposed zone with its surroundings. The likelihood of a zone bounding box being a zone decreases as the size of the edge-cutting weight cut increases.

(6) Text line alignment in a zone, which is denoted:

$$f_w^{(5)}(g) = \min(\text{var}(x_l), \text{var}(x_c), \text{var}(x_r)) \quad (7)$$

This feature provides the minimum variance of the left, center, and right coordinates of a line of text in a zone. The alignment improves as the variance decreases.

These features are heuristic in nature, but are specified independent of language and layout style. The features are not necessarily independent and are utilized to evaluate the "goodness" of proposed zones.

The binary edge classifier is trained (step 43) using word-graphs of training images. During data preparation, zone bounding boxes on the training word-graphs are manually labeled. Edges within zone bounding boxes are labeled positive edge samples, whereas those edges cut by zone bounding box borders are labeled negative samples. Next, a 22-dimensional feature vector is extracted, which includes a feature that accounts for height differences between pairs of words and the 21 Harr-like filter responses detected from an image patch. The image patch is cut by centering the image at the mid-point of an edge over an area that is four times larger than the union of the zone bounding boxes. Finally, the binary edge classifier is trained using the extracted feature vectors, such as described in C. C. Chang and C. J. Lin, "LIBSVM: a Library for Support Vector Machines," http://www.csie.ntu.edu.tw/~cjlin/libsvm (2001), the disclosure of which is incorporated by reference. Other types of learned binary edge classifiers are possible.

Zone Hypothesis Generation—the "Layout" Layer

The layout layer groups words into zones, which form a zone map. Each zone is a rectangle, but any polygon representation could be used. FIG. 5 is a diagram showing, by way of example, zone map. Other forms of zone maps are possible.

In terms of notation, the zone map Z is denoted:

$$Z = (N_z, \{z_j : j=1, \ldots, N_z\}) \quad (8)$$

where $N_z$ is the number of zones. Each zone z is denoted:

$$z_j = (\{c_i^{(j)} : i=1, \ldots, n_{cj}\}, \{v_k^{(j)} : k=1, \ldots, n_{wj}\}) \quad (9)$$

which is a polygon representation, such that $c_i^{(j)}$ is a corner of a zone bounding polygon; $n_{cj}$ is the number of vertices or corners of zone-j's bounding polygon; and $n_{wj}$ is the number of words in zone-j. Although described in terms of a rectangle, the teachings provided herein apply equally to other forms of polygons without loss of generality. Thus, each rectangular zone z is denoted:

$$z_j = (c_{ul}, c_{lr}, \{v_k^{(j)} : k=1, \ldots, n_{wj}\}) \quad (10)$$

where $c_{ul}$ and $c_{lr}$ are respectively upper-left and lower-right corners of a zone bounding box.

Figure 6:
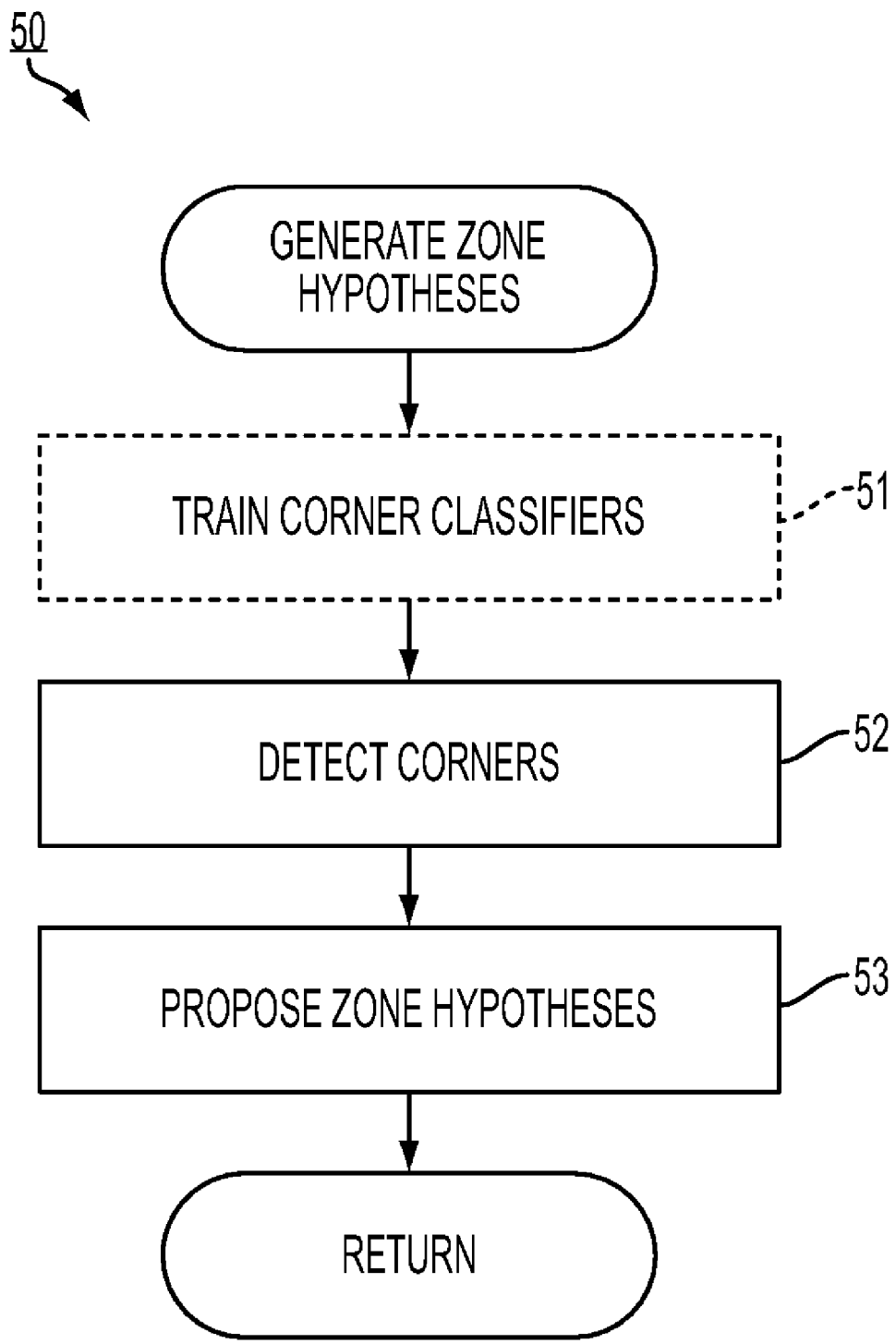
FIG. 6 is a process flow diagram showing a routine for generating a zone map for use in the method of FIG. 2.

FIG. 6 is a process flow diagram showing a routine 50 for generating a zone map for use in the method 30 of FIG. 2. First, corners of each zone bounding box within the digital image 14 are found (step 52), which can be determined through a learned corner classifier (step 51). Next, all possible zone hypotheses, that is, candidate zones, are proposed by pairing all detected upper-left corners with all lower-right corners (step 53). In a further embodiment, heuristics can be used to propose candidate zones more effectively by ruling out improbable configurations, such as discarding candidate zones that cross line separators.

A pair of corner classifiers to detect upper-left and lower-right corners are trained (step 52) using word-graphs of training images. During data preparation, upper-left and lower-right corners from labeled zones in the training word-graphs are used as positive samples. Negative samples are collected by randomly selecting the corners of word bounding boxes that are not the corners of actual zones. In addition, the corner set of training data by supplemented with bounding box corners of word-graph connected components to help ensure all possible corners are specified. Next, a 21-dimension generic visual feature vector is extracted from an image patch of a predetermined size, which is cut from the image centered at an upper-left or lower-right corner. Finally, a pair of corner classifiers are trained using the extracted feature vectors, such as described in Id. Other types of learned corner classifiers are possible.

Zone Models

From a generative model point of view, the zone hypotheses are causally dependent on the word-graph, which can be expressed as a joint probability:

$$p(G_w, Z) = p(G_w | Z) p(Z) \quad (11)$$

where $p(G_w | Z)$ is a likelihood model for zones, and $p(Z)$ is a prior model for zone relations. Costs and constraints can be assigned to the pair of learned generative zone models, from which non-overlapping zones can be inferred.

Likelihood Model for Zones

The likelihood model for zones for governs how words are organized in zones in terms of the features. The likelihood model for zones $p(G_w | Z)$ can be expressed:

$$p(G_w | Z) = p(g_{\overline{w}}) \prod_{i=1}^{N_z} p(g_i | z_i) \quad (12)$$

where $g_{\overline{w}}$ are sub-graphs of words not covered by any zone, such that $p(g_{\overline{w}}) = \exp(-|g_{\overline{w}}|)$; $|\cdot|$ denotes the cardinality function; $g_i$ is a sub-word-graph subsumed in zone-I; and $p(g_i | z_i)$ is a generative model for zones.

The likelihood model for zones can be constructed as a probabilistic model on word-sub-graphs, such that the expected value of each feature is the same as a corresponding average value extracted from training data. Given n labeled zones, the expected value E can be expressed:

$$E_j[f_w^{(j)}(g | z)] = \sum_{i=1}^{n} p(g_i | z_i) f_w^{(j)}(g_i | z_i) \quad (13)$$

$$= \frac{1}{n} \sum_{i=1}^{n} f_w^{(j)}(g_i | z_i)$$

$$= \mu_j$$

such that j=0, ..., 5, where j indexes the zone features. The observed feature statistics serve as constraints and based on the maximum entropy principle, the likelihood model for zones can be derived as:

$$p(g \mid z) = c\exp\left\{-\sum_{j=0}^{5} \lambda_j f_w^{(j)}(g \mid z)\right\} \quad (14)$$

where the $\lambda$'s are Lagrange multipliers or, more particularly, feature weights to be estimated; and c is a normalizing constant. As features $f_w^{(2)}$, $f_w^{(3)}$, and $f_w^{(4)}$ are context sensitive, the likelihood model for zones also encodes a certain amount of contextual information.

Figure 7:
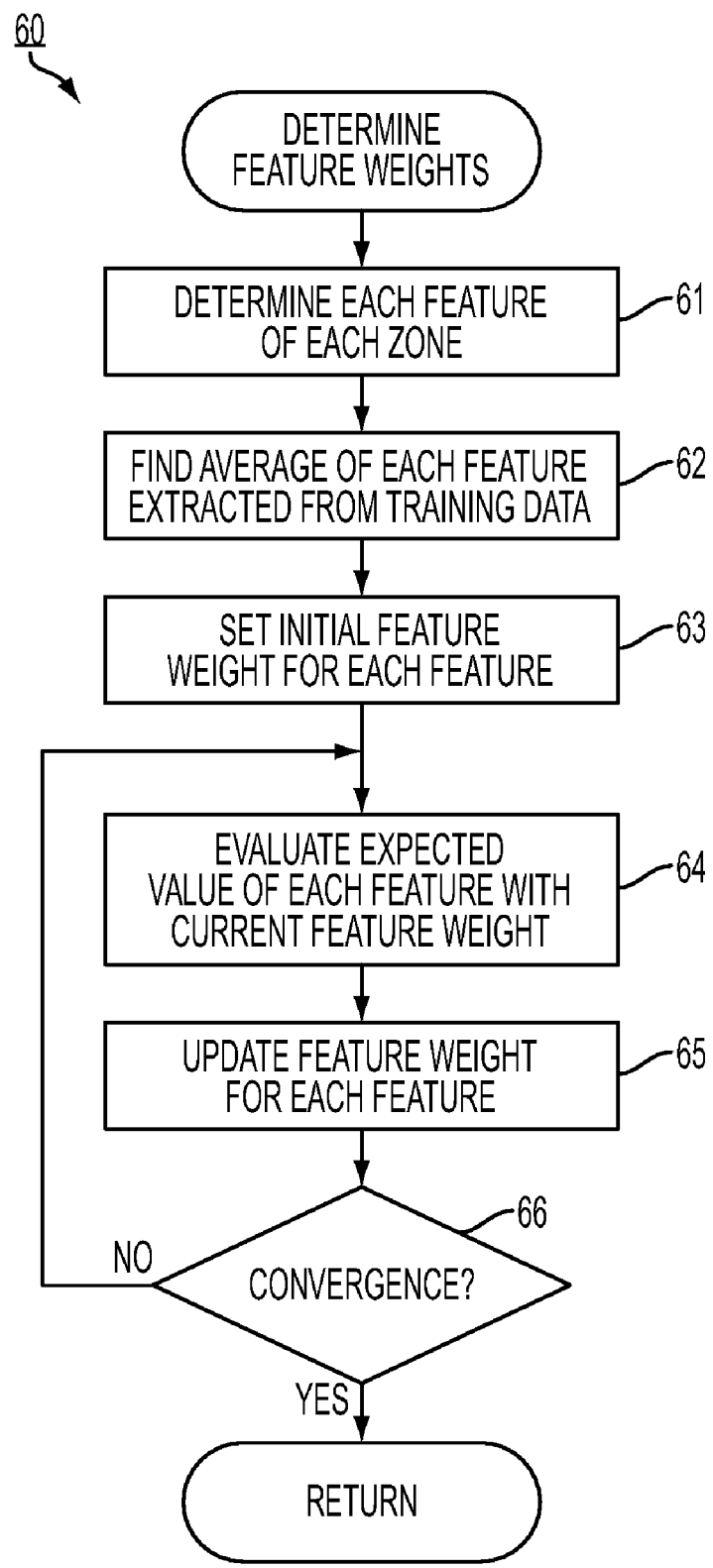
FIG. 7 is a process flow diagram showing a routine for determining feature weights for use in the method of FIG. 2.

The feature weights are solved iteratively using Generalized Iterative Scaling (GIS), such as described in J. N. Darroch and D. Rateli, "Generalized Iterative Scaling for Log-Linear Models," *Ann. Of Math. Stats.*, V. 43 (1972), the disclosure of which is incorporated by reference. FIG. 7 is a process flow diagram showing a routine for determining feature weights 60 for use in the method 30 of FIG. 2. Initially, given n labeled zones, each feature of each zone is determined (step 61), such that $f_w^{(j)}(g_i \mid z_i)$, where (j=0, ...,5, i=1, ...,n). The average of each feature extracted from the training data is found (step 62):

$$\mu_j = \frac{1}{n}\sum_{i=1}^{n} f_w^{(j)}(g_i \mid z_i) \quad (15)$$

where j=0, ..., 5. To initialize the GIS, an initial feature weight $\lambda$ for each feature is set (step 63):

$$\lambda_j^{(0)} = 1 \quad (16)$$

where j=0, ..., 5. During each iteration t of the GIS, an expected value of each feature is evaluated with the current feature weight (step 64), expressed:

$$E_j^{(t)}[f_w^{(j)}(g \mid z)] = \sum_{i=1}^{n} p^{(t)}(g_i \mid z_i) f_w^{(j)}(g_i \mid z_i) \quad (17)$$

where j=0, ..., 5. The feature weight for each feature is then updated (step 65):

$$\lambda_j^{(t+1)} = \lambda_j^{(t)} + \frac{1}{C}\log\frac{\mu_j}{E_j^{(t)}} \quad (18)$$

where j=0, ..., 5; C is a correction constant chosen large enough to cover an additional dummy feature, such as described in Id. In one embodiment, C=8. Iteration of the GIS continues until convergence (step 66).

Prior Model for Zone Relations

The prior model for zone relations governs each zone's shape and the spatial distribution of zones within a document page, including similarity, proximity, symmetry, and other attributes. The prior model for zone relations is characterized by a Gestalt ensemble for various Gestalt patterns, such as described in C. Guo et al., "Modeling Visual Patterns by Integrating Descriptive and Generative Methods," *Int'l J of Comp. Vision*, V. 53, No. 1, pp. 5-29 (June 2003), the disclosure of which is incorporated by reference. This model makes zone evaluation context sensitive. To minimize learning expense, the specificity of the document set is used opportunistically by requiring that each zone be a rectangle with no overlap between any two zones, such that:

$$p(\{z_1, \ldots, z_{N_z}\}) = \Pi_{i \neq j} \delta(z_i \cap z_j) \quad (19)$$

where $\delta(\cdot)$ is a Dirac delta function. The prior model for zone relations p(Z) can be expressed:

$$p(Z) = p(N_z)\prod_{i \neq j} \delta(z_i \cap z_j) \quad (20)$$

where $p(N_z)$ is prior knowledge on zone cardinality, which is assumed a uniform distribution.

Thus, the joint probability of a word-graph $G_w$ and zone partition Z is:

$$p(G_w, Z) = p(G_w \mid Z)p(Z) \quad (21)$$
$$= p(g_w)\left\{\prod_{i=1}^{N_z} p(g_i \mid z_i)\right\} \cdot p(N_z)\prod_{i \neq j} \delta(z_i \cap z_j)$$

Zone Inference

Figure 8:
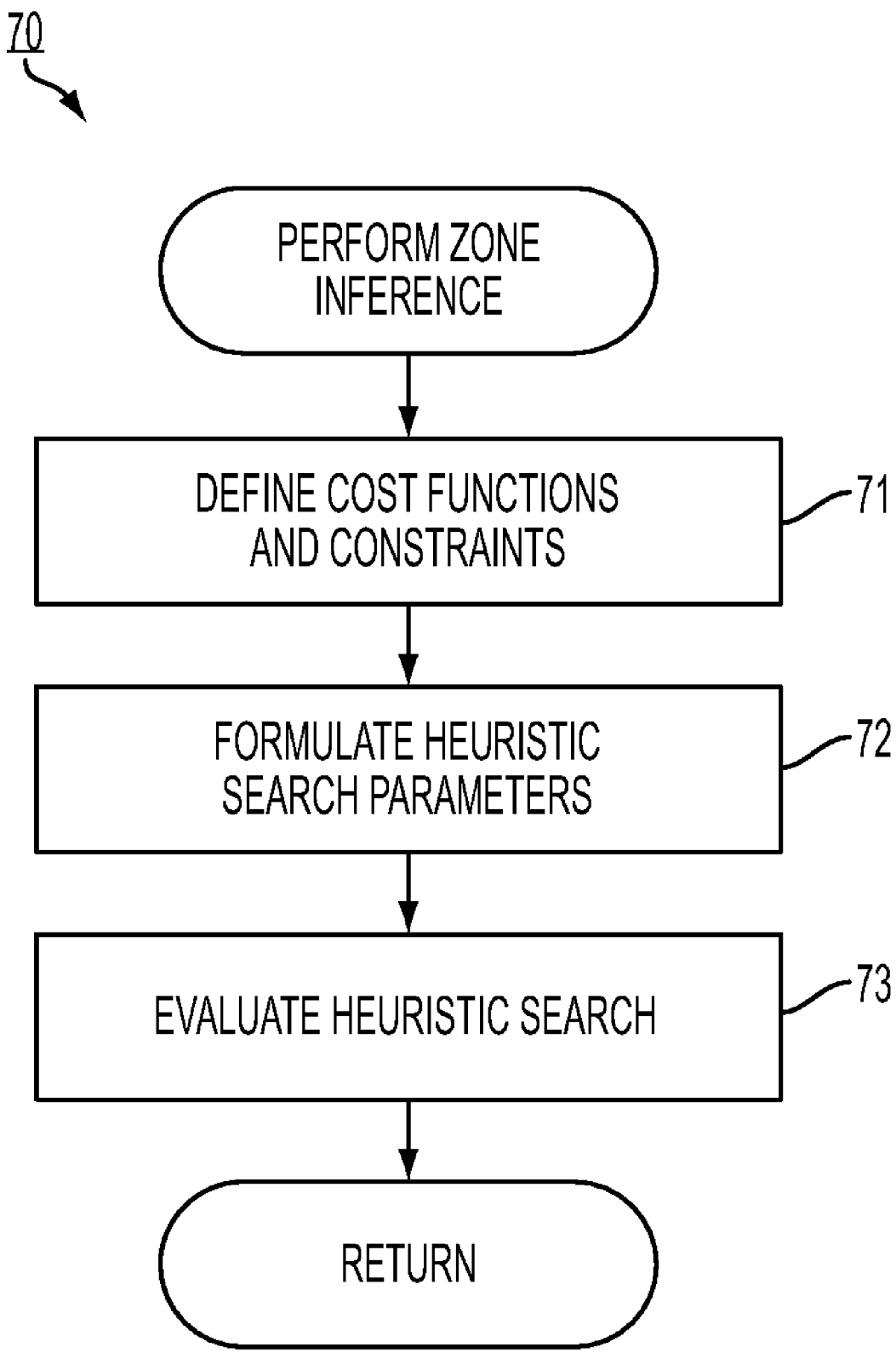
FIG. 8 is a process flow diagram showing a routine for performing zone inference for use in the method of FIG. 2.

The goal of document image decomposition is to segment a given document image into an optimal set of zones, such that the words in each zone are well organized, pairs of zones do not overlap, the full set of zones covers all of the words in the document, and the number of segmented zones conforms with prior knowledge. An optimal set of zones is inferred by converting learned data statistics into costs and constraints. FIG. 8 is a process flow diagram showing a routine for performing zone inference 70 for use in the method 30 of FIG. 2. The foundational aspects of inferring zones are described generally and specific forms of heuristic searches are described in detail by way of examples that include a binary integer linear programming problem and an A* best-first graph search. Other heuristic searches are possible.

Initially, a set of cost functions and constraints are defined to covert the statistical inference into an optimal set selection problem (step 71). Both the likelihood model for zones and the prior model for zone relations are learned probabilistic models. A probability $0 < P(\cdot) < 1$ can be converted into a cost as:

$$c(\cdot) = \rho(-\log P(\cdot)) \quad (22)$$

where $\rho(x)$ is a robust function for truncating extreme values. When $P(\cdot)=0$ or $P(\cdot)=1$, a binary constraint is generated. Accordingly, the learned probabilistic models generate the following cost functions and constraints: (1) an individual cost for each zone; (2) a binary constraint that selected zones cover all words in a page; and (3) a binary constraint requiring no overlap between any pair of zones.

The remaining operations, formulating heuristic search parameters (step 72) and evaluating the heuristic search (step 73) are heuristic-search dependent.

Binary Integer Linear Programming Problem

Once all possible zone hypotheses have been proposed, page decomposition can be expressed as an optimal set selection problem, which can be modeled as a binary integer linear programming (IPL) problem that can be passed to a standard IPL solver, such as CPLEX. Other IPL solvers are possible.

The binary IPL problem can be formulated by first introducing n binary variables $x_i$. Accordingly, given n candidate zones, x is a binary state vector, such that $x=(x_1, \ldots, x_n)$, such that $x_i=1$ means zone-i is selected and $x_i=0$, otherwise. Any specific choice of 0's or 1's for the components of x corresponds to selecting a particular subset of candidate zones. Thus, every choice of x represents a two-way partition of the set of zones between those zones that have been selected, and those zones that have not. The IPL problem parameters are formulated (step 72) in the context of document decomposition and evaluated (step 73):

(1) Total zone cost of the selection corresponding to x, defined as:

$$C_z(x) = c_z^T x \qquad (23)$$

where $c_z=(c_{z,1}, \ldots, c_{z,n})^T$ is a vector of individual zone costs determined only once according to equations (14) and (22) immediately after the candidate zones are proposed.

(2) Prior cost of total number of zones expected, defined as:

$$C_N(x) = c_N^T \Delta(1^T x) \qquad (24)$$

where $c_N=(c_{N,1}, \ldots, c_{N,m})^T$ is a vector, each of whose entries is the cardinality cost of zone-i, which is obtained from training data $p(N_z)$ and equation (22). Generally, $1 \leq m \leq n$ and $1 < N_z \leq m$. $\Delta(1^T x) = (\delta(1^T x - 1), \ldots, \delta(1^T x - N_z))^T$, where $\delta(\cdot)$ is a Dirac delta function. $C_N(x)$ returns a corresponding cost of the selected zone cardinality. However, the cost is not linear due to the Dirac delta function. Another set of binary variables $y=(y_1, \ldots, y_m)$ and two additional constraints are introduced to make the cost linear:

$$C_N(y) = c_N^T y$$

such that, $1^T y = 1$ $$1^T x = 1^T y \qquad (25)$$

where $I=(1, \ldots, m)^T$ is an index vector.

(3) Non-overlap constraint about each pair of zones: an n×n Boolean matrix M indicating pairwise zone overlaps is constructed immediately after the candidate zones are proposed. For each entry M(i, j), if TRUE, the $i^{th}$ zone overlaps with the $j^{th}$ zone; FALSE indicates no overlap. Only the upper left corner of matrix M is evaluated due to the symmetry of the matrix. Moreover, whenever M(i, j) is TRUE, the constraint $x_i = x_j \leq 1$ is enforced. The linear inequality constraints can be compactly expressed:

$$A_o x \leq 1 \qquad (26)$$

where matrix $A_o$ is generated from matrix M, such that for each M(i, j) that is TRUE, a row of zeroes is added, except that a '1' is placed in the $i^{th}$ and $j^{th}$ locations. 1 is the vector of all ones of appropriate size.

(4) Word covering constraint about a set of selected zones: Given $N_w$-word page, the selected set of zones should follow the constraint:

$$n_{wz}^T x = N_w \qquad (27)$$

where $n_{wz}=(n_{w,1}, \ldots, n_{w,n})^T$ and $N_{w,i}$ are the number of words in the $i^{th}$ candidate zone, which is only determined once immediately after the candidate zones are proposed.

Based on the IPL problem formulation, the goal can be expressed as:

minimize, $C_z(x) + C_N(y)$ such that, $1^T y = 1$ $1^T x = 1^T y$ $A_o x \leq 1$ $n_{wz}^T x = N_w$ $x_i \in \{0, 1\}, y_i \in \{0, 1\}$ $$I=(1, \ldots, m)^T \qquad (28)$$

Finally, applying equations (23) and (25), equation (23) can be rewritten as an integer linear program:

minimize, $c_N^T x + c_N^T y$ such that, $1^T y = 1$ $1^T x = 1^T y$ $A_o x \leq 1$ $n_{wz}^T x = N_w$ $x_i \in \{0, 1\}, y_i \in \{0, 1\}$ $$I=(1, \ldots, m)^T \qquad (29)$$

A* Best-First Graph Search

The A* search is a best-first graph search algorithm, which finds a path from an initial node to a goal node. The search maintains a set of partial solutions that are paths through the graph, starting at an initial node, and which are stored in a priority queue. The priority assigned to a path passing through a node x is determined by the function:

$$f(x) = g(x) + h(x)$$

where g(x) is a cost function that measures the cost incurred from the initial node to the current node x; and h(x) is a heuristic function that estimates the cost from the current node x to the goal node. To ensure the search finds an optimal solution, h(x) must be admissible.

After zone hypotheses are proposed, page decomposition can be formulated as a weighted polygon partitioning problem in computational geometry: given a polygon (a document page) and a set of candidate sub-polygons (zones), each zone having an associated weight (cost), the goal becomes partitioning the polygon into a subset of disjoint sub-polygons from the candidate set, so as to cover every word in a document image with minimum cost. This page decomposition problem can be solved by an A* search, which exploits heuristics from data to improve search performance.

The A* search operates on a set of parameters, which are formulated (step 72) in the context of document decomposition and evaluated (step 73):

(1) State Variable x: Given n candidate zones, x is a binary state vector, such that $x=(x_1, \ldots, x_n)$, such that $x_i=1$ means zone-i is selected and $x_i=0$, otherwise. Any specific choice of 0's or 1's for the components of x corresponds to selecting a particular subset of candidate zones.

(2) Goal State: the goal state is that every word in a given document is covered by only one zone.

(3) Cost Function: The cost of each path to x is defined as:

$$g(x) = c_z^T x \quad (29)$$

where $c_z = (c_{z1}, \ldots, c_{zn})^T$ is a vector of individual zone costs determined only once according to equations (14) and (22) immediately after the candidate zones are proposed.

(4) Heuristic Function: to insure that the A* search is admissible or optimal, the heuristic function h(x) must not overestimate the actual cost of reaching the goal state. To ensure admissibility, h(x) for a path from x to the goal state, the minimum number of non-overlapping polygons to partition the rest of the document page that has not been covered by the selected zones, $n_z(x)$, is estimated, assuming that both the document and the zones are represented by rectangles, using the expression:

$$h(x) = n_z(x) * c_{min} \quad (30)$$

where $c_{min}$ is the minimum zone cost learned from the training data. The estimate of $n_z(x)$ involves partitioning the complementary polygon of a state x, which is created by removing the selected zones (rectangles) from the document page (a rectangle) to form a minimum number of non-overlapping rectangles, restricted to only orthogonal polygons whose edges are either horizontal or vertical, such as described in W. Lipski et al., "On Two Dimensional Data Organization II," Fundamental Informaticae, V. 2, pp. 227-243 (1977), the disclosure of which is incorporated by reference.

While the invention has been particularly shown and described as referenced to the embodiments thereof, those skilled in the art will understand that the foregoing and other changes in form and detail may be made therein without departing from the spirit and scope.

What is claimed is:

1. A system for decomposing a digital image, comprising:
   a digital image stored as a word-graph comprising words and visualized features, and zone hypotheses that group one or more of the words; and
   an image decomposer, comprising:
     a zone modeler expressing causal dependencies of the zone hypotheses through a learned generative zone model to which costs and constraints are assigned; and
     a zone inference engine inferring an optimal set of the zone hypotheses, which are non-overlapping, through a heuristic search of the costs and constraints.

2. A system according to claim 1, further comprising:
   a digital image representation builder forming a two-layer hierarchical model comprising a word-graph of the words and the visualized features, and the zone hypotheses, which are causally dependent on the word-graph.

3. A system according to claim 2, wherein each of the visualized features are assigned to a vertex in the word-graph, an edge between each pair of vertices in the word-graph is connected, and a weight is associated with the edge as a bounding force between the vertices connected by the edge.

4. A system according to claim 3, further comprising:
   a learned binary edge classifier being applied to the word-graph of the visualized features, wherein the weight associated with the edge is set to a corresponding posterior probability returned from the learned binary edge classifier.

5. A system according to claim 2, wherein the visualized features are selected from the group comprising word compactness, word size consistency, zone bounding box top border edge-cutting span, zone bounding box bottom border edge-cutting span, zone bounding box vertical border average edge-cutting weight, and text line alignment.

6. A system according to claim 2, wherein each of the zone hypotheses are defined as a polygon specified within the digital image.

7. A system according to claim 1, wherein the learned generative zone model is determined as a joint probability of the word-graph and the zone hypotheses.

8. A system according to claim 7, wherein the probability of the word graph is expressed as a likelihood model for zones that organizes the words in terms of the visualized features.

9. A system according to claim 8, wherein the likelihood model for zones is determined with an expected value of each visualized feature substantially approximating an average value for that visualized feature as learned from training data.

10. A system according to claim 7, wherein the probability of the zone hypotheses is expressed as a prior model for zone relations that controls shape and spatial distribution of each zone hypothesis within the digital image.

11. A system according to claim 1, further comprising:
    a heuristic search engine selecting the heuristic search from the group comprising a binary integer linear programming problem and an A* best-first graph search.

12. A method for decomposing a digital image, comprising:
    representing a digital image as a word-graph comprising words and visualized features, and zone hypotheses that group one or more of the words;
    expressing causal dependencies of the zone hypotheses through a learned generative zone model to which costs and constraints are assigned; and
    inferring, using a computer, an optimal set of the zone hypotheses, which are non-overlapping, through a heuristic search of the costs and constraints.

13. A method according to claim 12, further comprising:
    forming a two-layer hierarchical model comprising a word-graph of the words and the visualized features, and the zone hypotheses, which are causally dependent on the word-graph.

14. A method according to claim 13, further comprising:
    assigning each of the visualized features to a vertex in the word-graph;
    connecting an edge between each pair of vertices in the word-graph; and
    associating a weight with the edge as a bounding force between the vertices connected by the edge.

15. A method according to claim 14, further comprising:
    applying a learned binary edge classifier to the word-graph of the visualized features; and
    setting the weight associated with the edge to a corresponding posterior probability returned from the learned binary edge classifier.

16. A method according to claim 13, further comprising:
    selecting the visualized features from the group comprising word compactness, word size consistency, zone bounding box top border edge-cutting span, zone bounding box bottom border edge-cutting span, zone bounding box vertical border average edge-cutting weight, and text line alignment.

17. A method according to claim 13, further comprising:
    defining each of the zone hypotheses as a polygon specified within the digital image.

18. A method according to claim 12, further comprising:
determining the learned generative zone model as a joint probability of the word-graph and the zone hypotheses.

19. A method according to claim 18, further comprising:
expressing the probability of the word graph as a likelihood model for zones that organizes the words in terms of the visualized features.

20. A method according to claim 19, further comprising:
determining the likelihood model for zones with an expected value of each visualized feature substantially approximating an average value for that visualized feature as learned from training data.

21. A method according to claim 18, further comprising:
expressing the probability of the zone hypotheses as a prior model for zone relations that controls shape and spatial distribution of each zone hypothesis within the digital image.

22. A method according to claim 18, wherein the joint probability $p(G_w,Z)$ of the word-graph $G_w$ and the zone hypotheses Z is expressed by the equation:

$$p(G_w, Z) = p(g_{\overline{w}})\left\{\prod_{i=1}^{N_z} p(g_i \mid z_i)\right\} \cdot p(N_z) \prod_{i \neq j} \delta(z_i \cap z_j)$$

where $g_{\overline{w}}$ is a sub-graph of words not covered by any zone hypothesis, $p(g_{\overline{w}})=\exp(-|g_{\overline{w}}|)$, $g_i$ is a sub-word-graph subsumed in zone i, $p(g_i|z_i)$ is generative zone model, $z_i$ is an $i^{th}$ zone hypothesis, and $\delta(\cdot)$ is a Dirac delta function.

23. A method according to claim 12, further comprising:
selecting the heuristic search from the group comprising a binary integer linear programming problem and an A* best-first graph search.

24. A method according to claim 23, wherein the binary integer linear programming problem I is expressed by the program:

minimize, $c_N^T x = c_N^T y$ such that, $1^T y = 1$ $1^T x = 1^T y$ $A_o x \leq 1$ $n_{wz}^T x = N_w$ $x_i \in \{0, 1\}, y_i \in \{0, 1\}$ $I = (1, \ldots, m)^T$ where x is a binary state vector, such that $x=(x_1, \ldots, x_n)$; $c_z^T x$ is a total zone cost corresponding to x; $c_z=(c_{z,1}, \ldots, c_{z,n})^T$ is a vector of individual zone costs; $A_o x \leq 1$ is a non-overlap constraint about each pair of zones; $n_{wz}^T x$ is a word covering constraint for a set of selected zones; $n_{wz}=(n_{w,1}, \ldots, n_{w,n})^T$ is a vector of a number of words in an $i^{th}$ zone hypothesis; and $I=(1, \ldots, m)^T$ is an index vector.

25. A method according to claim 23, wherein the A* best-first graph search f(x) is expressed by the equation:

$f(x) = g(x) + h(x)$ where x is a binary state vector, such that $x=(x_1, \ldots, x_n)$; g(x) is a cost function measuring a cost of each path from an initial vertex to x, such that $g(x)=c_z^T x$, where $c_z=(c_{zl}, \ldots, c_{zn})^T$ is a vector of individual zone costs; and h(x) is a heuristic function estimating cost from x to a goal vertex, such that $h(x)=n_z(x)* C_{min}$, where $n_z(x)$ is an estimate of a partitioning of a complementary polygon of a state x and $c_{min}$ is a minimum zone cost learned from training data.

26. A non-transitory computer-readable storage medium holding code for performing the method according to claim 12.

* * * * *